(12) United States Patent
Saka et al.

(10) Patent No.: US 10,214,084 B2
(45) Date of Patent: Feb. 26, 2019

(54) VEHICLE REAR STRUCTURE

(71) Applicant: MAZDA MOTOR CORPORATION, Hiroshima (JP)

(72) Inventors: Hirofumi Saka, Higashihiroshima (JP); Naotomo Hashimoto, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 74 days.

(21) Appl. No.: 15/542,376

(22) PCT Filed: Oct. 20, 2016

(86) PCT No.: PCT/JP2016/081123
§ 371 (c)(1),
(2) Date: Jul. 7, 2017

(87) PCT Pub. No.: WO2017/073456
PCT Pub. Date: May 4, 2017

(65) Prior Publication Data
US 2018/0001752 A1    Jan. 4, 2018

(30) Foreign Application Priority Data

Oct. 29, 2015   (JP) ................................. 2015-213074

(51) Int. Cl.
*B60J 7/14*     (2006.01)
*B60J 7/22*     (2006.01)
*B60J 1/18*     (2006.01)

(52) U.S. Cl.
CPC ............. *B60J 7/143* (2013.01); *B60J 1/1823* (2013.01); *B60J 7/223* (2013.01)

(58) Field of Classification Search
CPC ........... B60J 7/143; B60J 7/223; B60J 1/1823
See application file for complete search history.

(56) References Cited

U.S. PATENT DOCUMENTS

2004/0245804 A1   12/2004   Schmitt et al.
2015/0298530 A1   10/2015   Pennington

FOREIGN PATENT DOCUMENTS

EP    1 547 838 A1    6/2005
JP    H04-100731 A    4/1992
(Continued)

OTHER PUBLICATIONS

International Search Report issued in PCT/JP2016/081123; dated Jan. 24, 2017.

*Primary Examiner* — D Glenn Dayoan
*Assistant Examiner* — Melissa A Black
(74) *Attorney, Agent, or Firm* — Studebaker & Brackett PC

(57) ABSTRACT

A vehicle rear structure is applied to a vehicle, in which at least one of a roof and a rear window is capable of being accommodated in a vehicle body. The structure includes a deflection plate standing upright between a pair of seats on the rear side of the seats, and a light source provided on the lower front side of the deflection plate. When it is assumed that an imaginary straight line connecting between the light source and a reflection surface of the deflection plate is a first imaginary line, an imaginary straight line connecting between a middle portion of a rear view mirror and the reflection surface of the deflection plate is a second imaginary line, and an imaginary straight line orthogonal to the reflection surface of the deflection plate is a reference imaginary line, the reflection surface of the deflection plate is inclined at a predetermined angle in such a manner that the angle defined by the reference imaginary line and the first imaginary line, and the angle defined by the reference imaginary line and the second imaginary line are different from each other in a side view.

10 Claims, 12 Drawing Sheets

(56) References Cited

FOREIGN PATENT DOCUMENTS

| | | |
|---|---|---|
| JP | 2000-177399 A | 6/2000 |
| JP | 2005-178707 A | 7/2005 |
| JP | 2006-035935 A | 2/2006 |

VEHICLE REAR STRUCTURE

TECHNICAL FIELD

The present invention relates to a rear structure of a vehicle including an openable rear window, for instance, wherein the vehicle rear structure is provided with a deflection plate configured to deflect turbulent air flowing into a vehicle compartment from the rear side of a seat when the rear window is opened.

BACKGROUND ART

In a so-called convertible vehicle, i.e., a vehicle including an openable roof on a top portion of a vehicle compartment portion where a passenger is seated, traveling air from the vehicle front side flows rearwardly of the vehicle along a surface of a vehicle body in a state that the openable roof is closed (a closed state).

On the other hand, in a state (an opened state) that the openable roof is opened, traveling air is less likely to stably flow rearwardly due to an opening formed in the top portion of the vehicle. Further, the vehicle compartment becomes a negative pressure state, as compared with the outside of the vehicle. Therefore, a flow of traveling air flowing through the top portion of the vehicle is likely to change, as compared with a state that the openable roof is closed.

For instance, it is known that in a state that an openable roof is opened, a part of traveling air flowing rearwardly of a seat over a front window changes its direction in such a manner that air is caused to flow back forwardly due to a negative pressure of a vehicle compartment (so-called turbulent air).

Therefore, in a state that an openable roof is opened, a passenger may feel annoyed with wind that impinges on the passenger due to turbulent air flowing into a vehicle compartment, whose direction is changed from air flowing rearwardly of a vehicle to air flowing forwardly of the vehicle, or noise caused by the wind.

In view of the above, various techniques are proposed to avoid wind in a state that an openable roof is opened, or noise caused by the wind.

For instance, in Patent Literature 1, there is provided a deflector device between, a pair of left and right seats and on the vehicle rear side of the seats in order to deflect turbulent air flowing into a vehicle compartment from the rear side of the seats in a state that an openable roof is opened. Further, the deflector device disclosed in Patent Literature 1 includes a deflection plate (a deflector plate) made of synthetic resin having transparency. Thus, in Patent Literature 1, the deflection plate is made transparent, and enhanced rear visibility is secured.

A rear view mirror configured to allow a passenger to see a rear area of a seat is disposed on the upper front side of a deflection plate. As a result, when the passenger sees the rear area through the rear view mirror, the passenger may also see the deflection plate disposed between the seats through the rear view mirror.

Nowadays, it is often the case that various switches such as an operation switch configured to allow a passenger to operate a navigation device, or an operation switch configured to allow a passenger to switch the suspension mode are disposed on a center console located on the lower front side of a deflection plate. A light source configured to emit light in association with turning on of a side marker lamp may be disposed in the switch.

In view of the above, in a case where a deflection plate made of a material having light reflectivity such as resin having transparency is provided as a deflection plate, illumination light emitted from a light source in a switch may be reflected by the deflection plate, and may be reflected on the rear view minor.

Specifically, in a vehicle provided with a deflection plate, illumination light from a switch may be reflected on a rear view mirror. This may obstruct a passenger from seeing a rear area through the rear view mirror.

CITATION LIST

Patent Literature

Patent Literature 1: Japanese Unexamined Patent Publication No. 2005-478707

SUMMARY OF INVENTION

In view of the aforementioned inconveniences, an object of the present invention is to provide a vehicle rear structure, which enables to avoid lowering of rear visibility due to reflection light reflected by a deflection plate.

In order to solve the aforementioned inconveniences, the present invention is directed to a rear structure of a vehicle provided with a pair of left and right seats disposed in a vehicle compartment, a roof configured to cover an upper portion of the vehicle compartment, and a rear window located on a vehicle rear side of the roof, the vehicle rear structure being capable of accommodating at least one of the roof and the rear window in a vehicle body. The vehicle rear structure includes a deflection plate standing upright between the paired seats and on a rear side of the seats; and a light source provided on a lower front side of the deflection plate. The deflection plate includes a reflection surface configured to reflect light forwardly. When it is assumed that an imaginary straight line connecting between the light source and the reflection surface of the deflection plate is a first imaginary line, an imaginary straight line connecting between a middle portion of a rear view mirror provided on an upper front side of the deflection plate, and the reflection surface of the deflection plate is a second imaginary line, and an imaginary straight line orthogonal to the reflection surface of the deflection plate is a reference imaginary line, the reflection surface of the deflection plate is an inclined surface inclined at a predetermined angle in such a manner that an angle defined by the reference imaginary line and the first imaginary line, and an angle defined by the reference imaginary line and the second imaginary line are different from each other in a side view.

DESCRIPTION OF EMBODIMENTS

In the following, an embodiment of the present invention is described with reference to the drawings.

Figure 1:
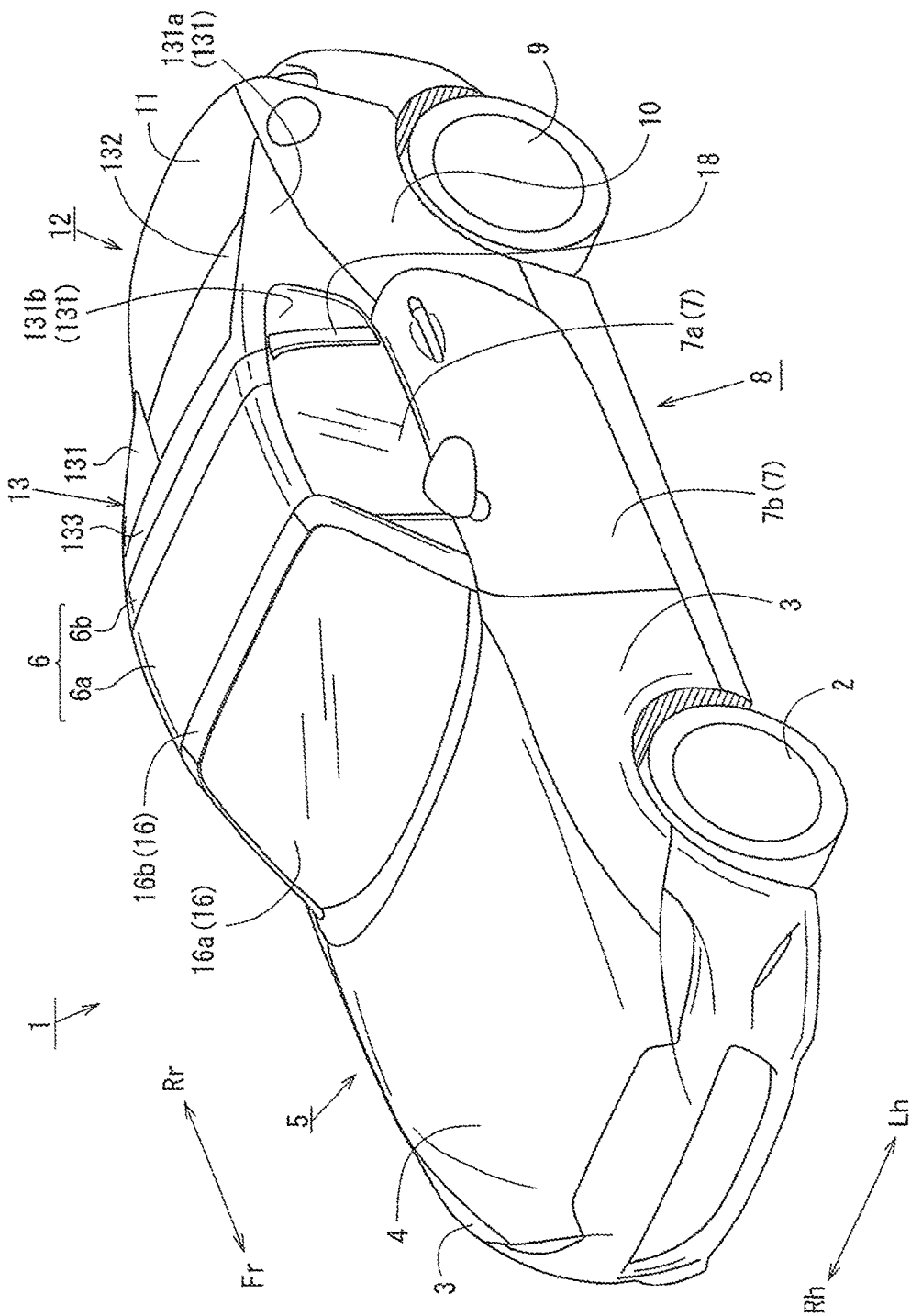
FIG. 1 is a perspective view illustrating an external appearance of a vehicle in a state that an openable roof is closed.
Figure 2:
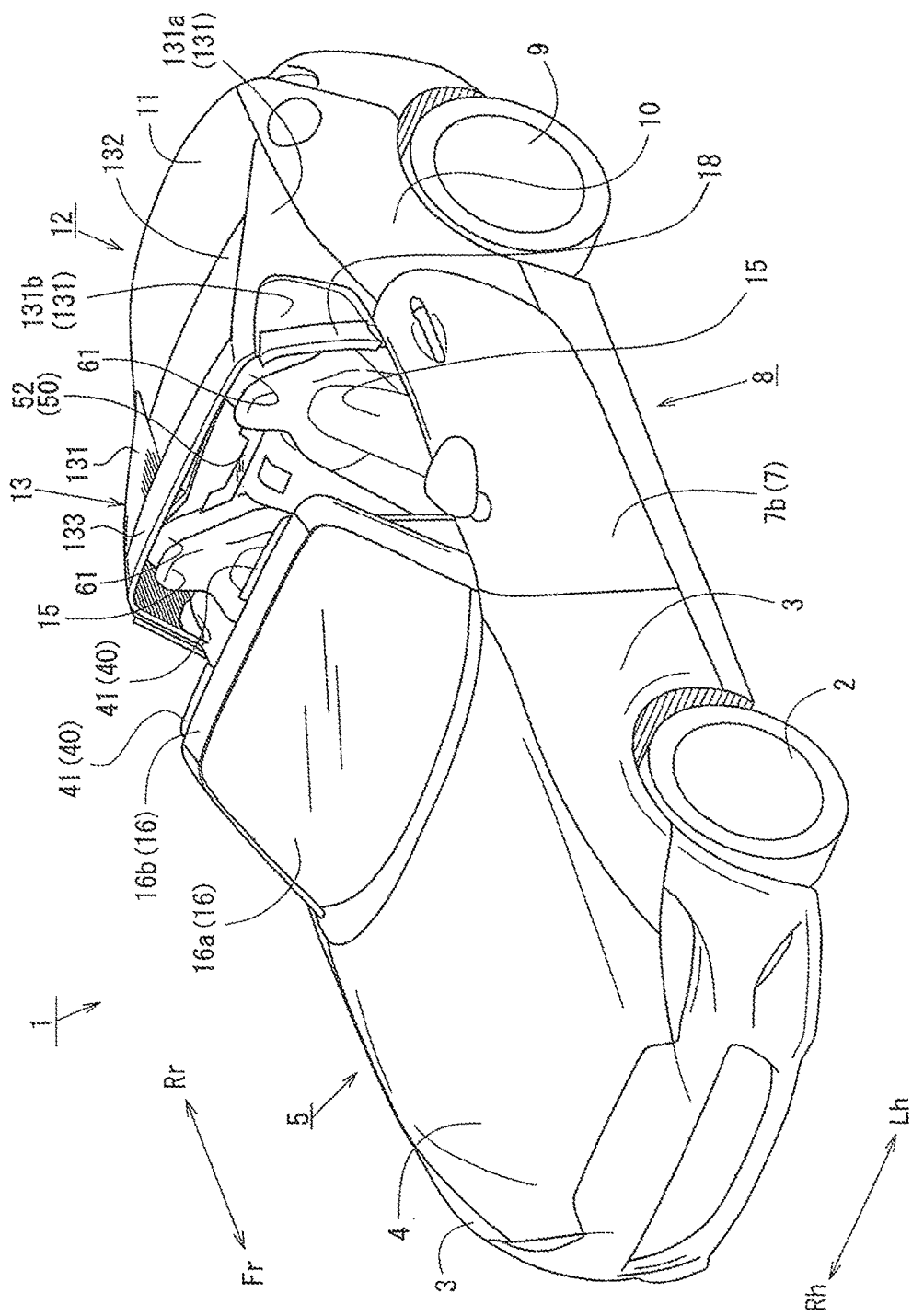
FIG. 2 is a perspective view illustrating an external appearance of the vehicle in a state that the openable roof is opened.
Figure 3:
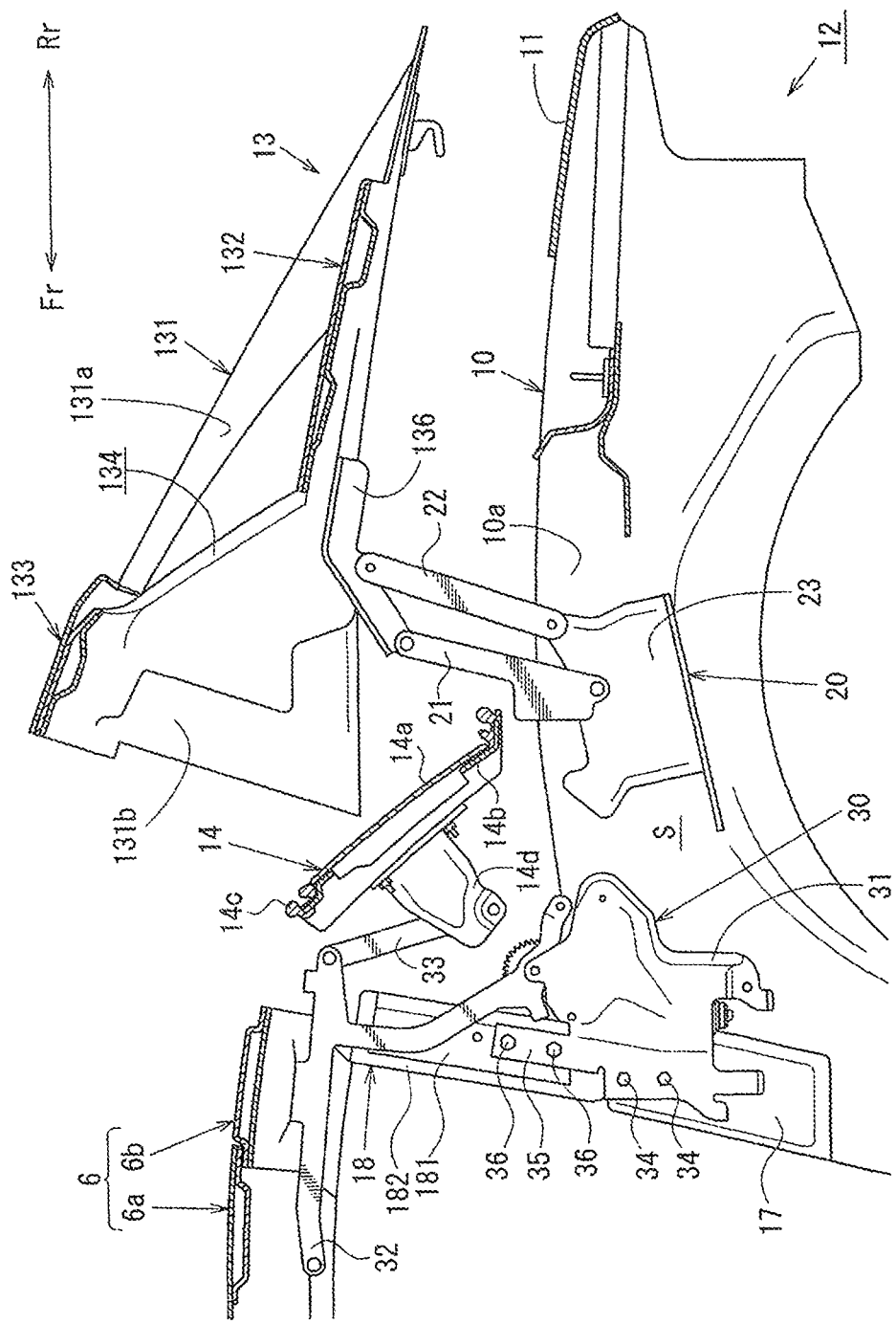
FIG. 3 is a side view of an open/close mechanism in a state that a deck cover is lifted when viewed from the inside of the vehicle.
Figure 4:
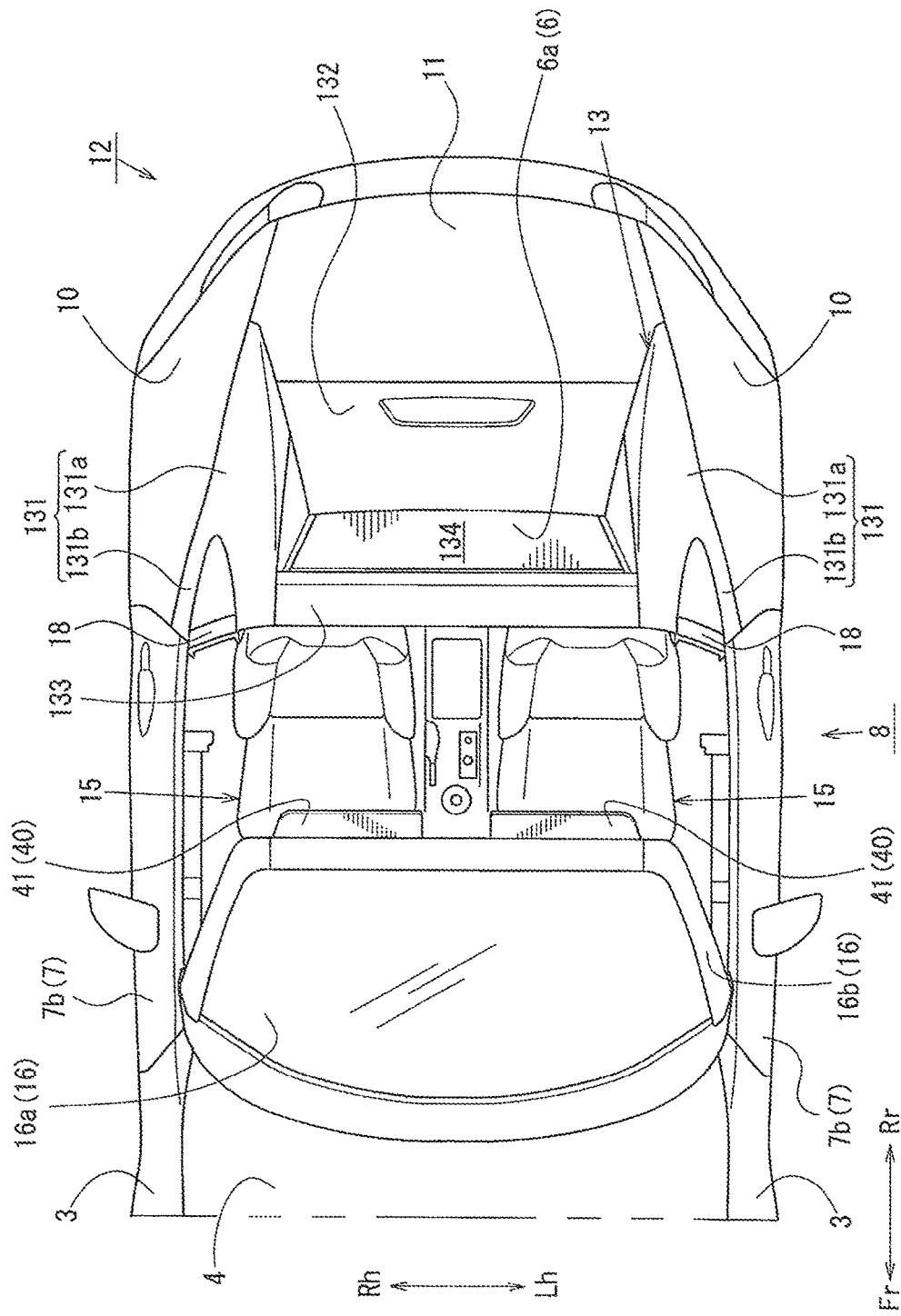
FIG. 4 is a plan view illustrating an external appearance of the vehicle in a state that the openable roof is opened.

A vehicle 1 in the embodiment is described in detail using FIG. 1 to FIG. 9. FIG. 1 is a perspective view illustrating an external appearance of the vehicle 1 in a state that an openable roof 6 is closed. FIG. 2 is a perspective view illustrating an external appearance of the vehicle 1 in a state that the openable roof 6 is opened. FIG. 3 is a side view of an open/close mechanism in a state that a deck cover 13 is lifted when viewed from the inside of the vehicle. FIG. 4 is a plan view illustrating an external appearance of the vehicle 1 in a state that the openable roof 6 is opened.

Figure 5:
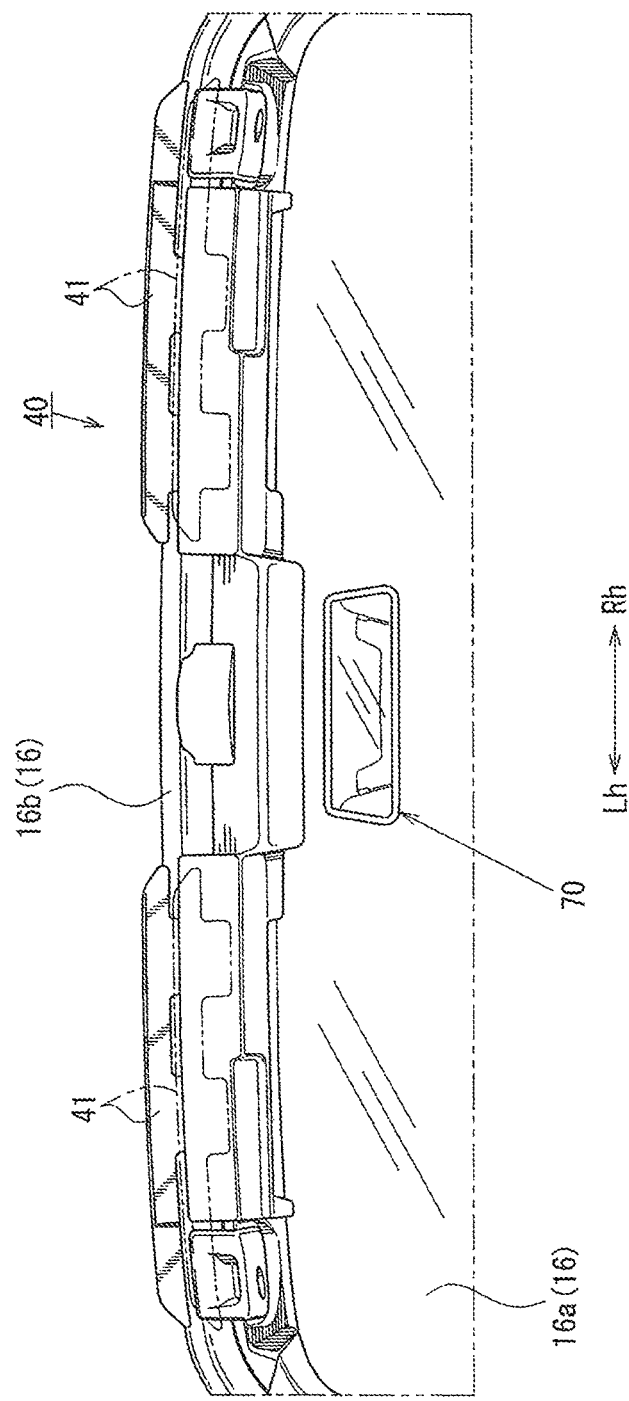
FIG. 5 is a rear view illustrating an external appearance of front deflector devices when viewed from the inside of a vehicle compartment.
Figure 6:
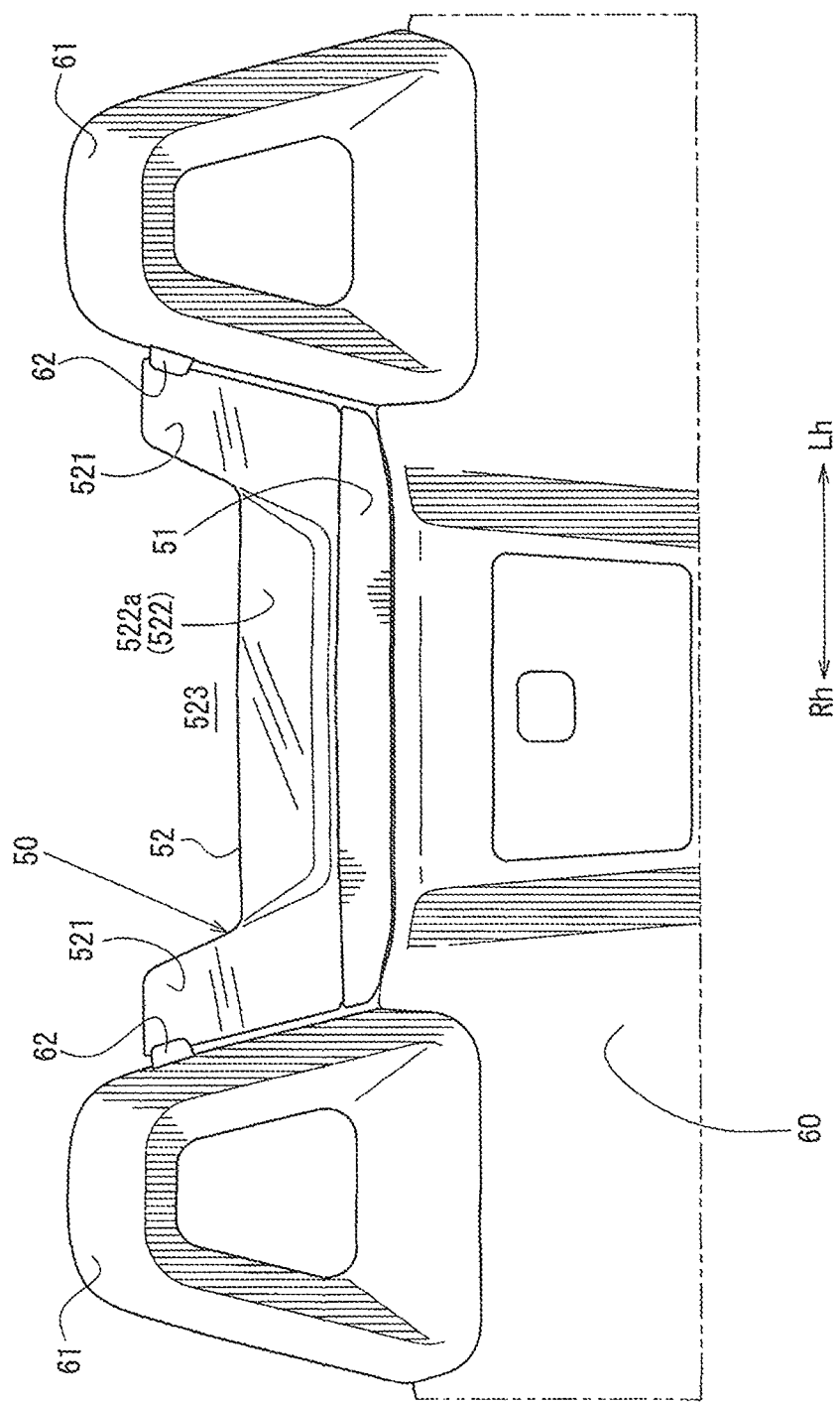
FIG. 6 is a front view illustrating an external appearance of a rear deflector when viewed from the inside of the vehicle compartment.
Figure 7:
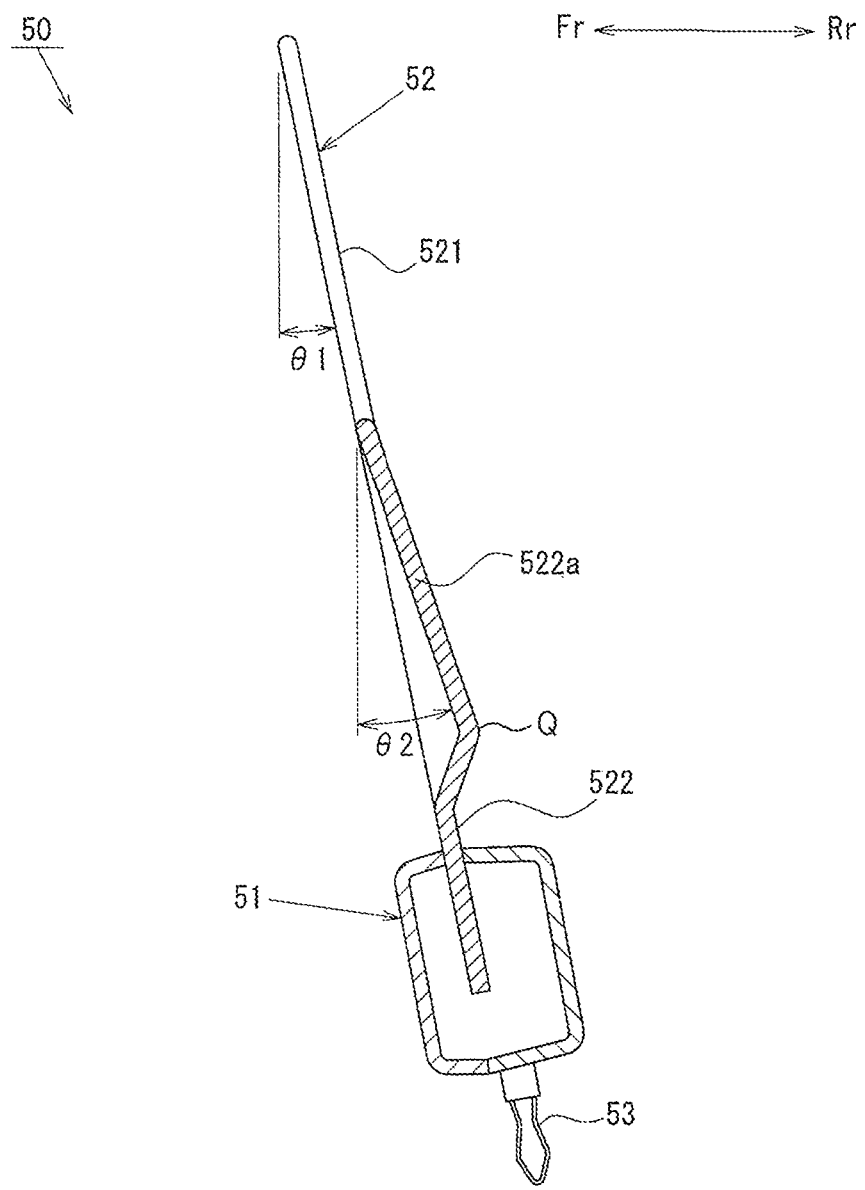
FIG. 7 is a sectional view illustrating a section of the rear deflector taken along a front-rear direction of the vehicle.
Figure 8:
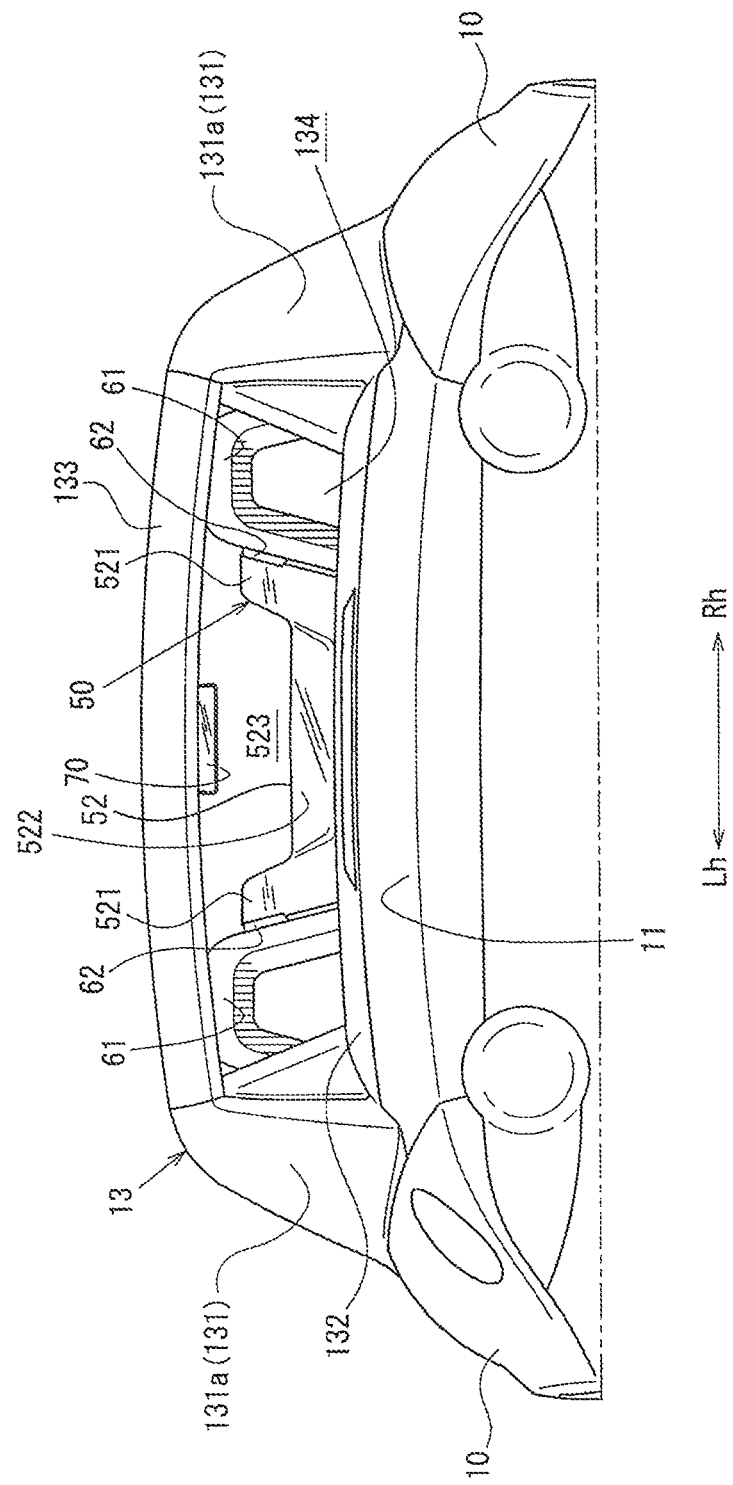
FIG. 8 is a rear view illustrating an external appearance of the rear deflector when viewed through a rear window opening.
Figure 9:
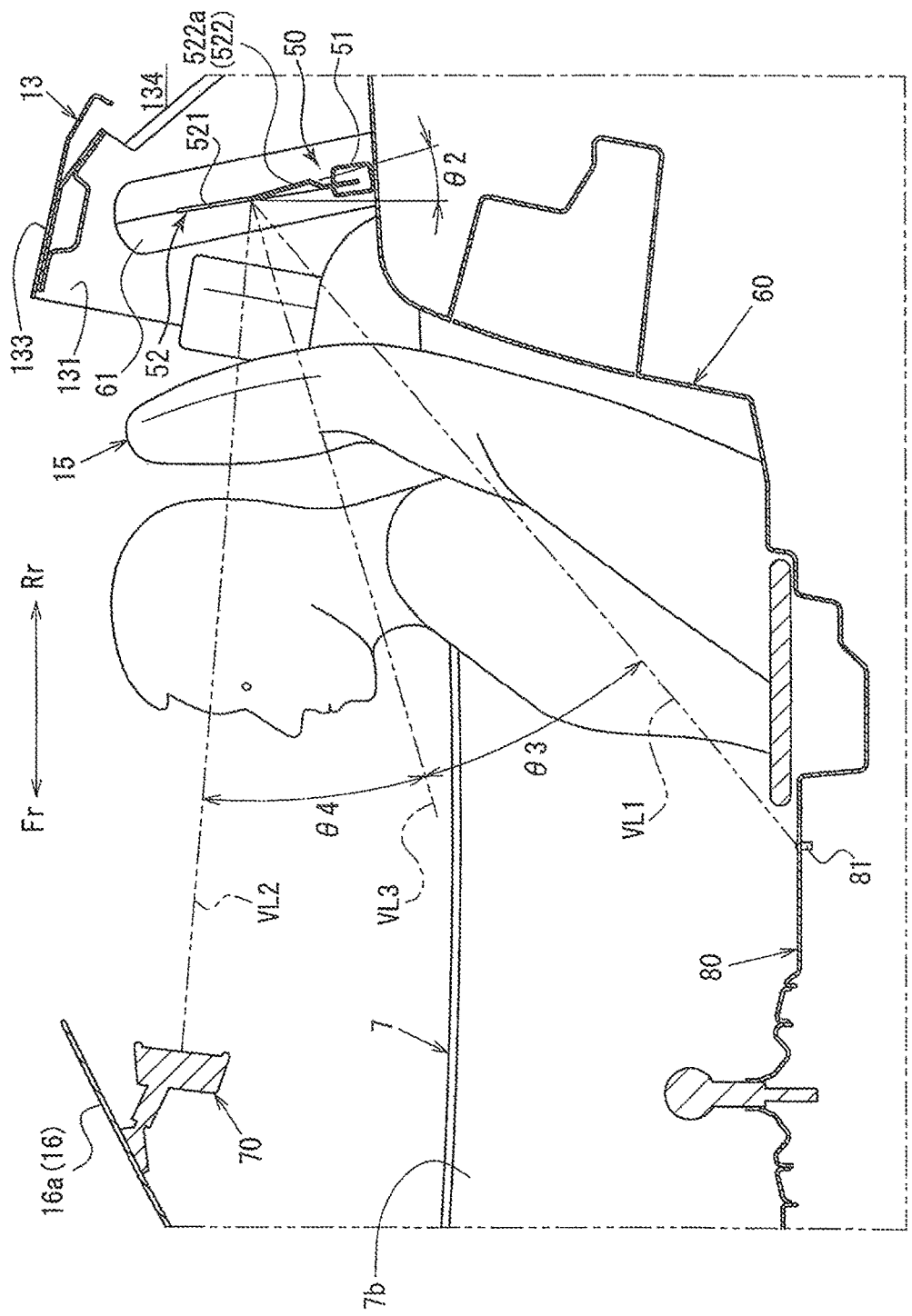
FIG. 9 is an explanatory diagram illustrating an angle of forward inclination of a recess portion formed in the rear deflector.

FIG. 5 is a rear view illustrating an external appearance of front deflector devices 40 when viewed from the inside of a vehicle compartment. FIG. 6 is a front view illustrating an external appearance of a rear deflector 50 when viewed from the inside of the vehicle compartment. FIG. 7 is a sectional view illustrating a section of the rear deflector 50 taken along the front-rear direction of the vehicle. FIG. 8 is a rear view illustrating an external appearance of the rear deflector 50 when viewed through a rear window opening 134. FIG. 9 is an explanatory view illustrating an angle θ2 of forward inclination of a recess portion 522a of the rear deflector 50.

In the drawings, the arrow Fr indicates a front side of the vehicle 1, and the arrow Rr indicates a rear side of the vehicle 1. The arrow Lh indicates a left side of the vehicle 1, and the arrow Rh indicates a right side of the vehicle 1. Further, an upper side in FIG. 1 corresponds to an upper side of the vehicle 1, and a lower side in FIG. 1 corresponds to a lower side of the vehicle 1. Note that, unless otherwise specifically mentioned, a front side, a rear side, a left side, a right side, an upper side and a lower side in the specification indicate the respective directions with respect to the vehicle 1 as described above.

As illustrated in FIG. 1, the vehicle 1 in the embodiment includes a vehicle front portion 5, a vehicle compartment portion 8, and a vehicle rear portion 12 from the front side to the rear side. The vehicle front portion 5 includes a pair of left and right front wheels 2, a pair of left and right front fenders 3, and a hood 4. The vehicle compartment portion 8 includes the openable roof 6 (corresponding to a "roof" in the claims) constituting an upper surface of the vehicle compartment portion 8, and a pair of left and right doors 7. The vehicle compartment portion 8 defines a vehicle compartment where a passenger is seated. The vehicle rear portion 12 includes a pair of left and right rear wheels 9, a pair of left and right rear fenders 10, and a trunk lid 11.

As illustrated in FIG. 2 and FIG. 3, an upwardly opened accommodation portion S is formed at a position close to the front side and between the paired left and right rear fenders 10. The vehicle rear portion 12 includes the deck cover 13 configured to close an opening of the accommodation portion S.

The vehicle 1 of the embodiment is a so-called convertible vehicle. Specifically, as illustrated in FIG. 1 to FIG. 3, the openable roof 6 is collapsibly folded and accommodated in the accommodation portion S in an opened state by moving the deck cover 13 upwardly and rearwardly, and a rear window 14 is accommodated in association with accommodation of the openable roof 6.

More specifically, the accommodation portion S is formed to have an inner space of a size capable of accommodating the openable roof 6 in a folded state, and the rear window 14.

As illustrated in FIG. 2 to FIG. 4, the deck cover 13 configured to cover an opening of the accommodation portion S is formed to define a rear portion of a vehicle compartment. More specifically, the deck cover 13 is formed to define a portion of a vehicle compartment located on the upper side of a door body 7b of the door 7, and located on the rear side of a rear end of a door glass 7a of the door 7.

The deck cover 13 includes a pair of left and right cover side portions 131 opposing to each other in the vehicle width direction, a cover base portion 132 configured to connect between lower portions of the cover side portions 131, and a cover header portion 133 configured to connect between upper portions of the cover side portions 131.

Further, the deck cover 13 includes the rear window opening 134 surrounded by the paired left and right cover portions 131, the cover base portion 132, and the cover header portion 133. The rear window 14 is openably mounted in the rear window opening 134.

The paired left and right cover side portions 131 integrally include a pair of left and right bulging portions 131a bulging upwardly from the paired left and right rear fenders 10, and a pair of left and right side wall portions 131b extending forwardly from the bulging portions 131a.

Each of the paired left and right bulging portions 131a is formed to extend from a position close to the rear side of a front end of the trunk lid 11 to a position on the front side of the front end, and to bulge upwardly and continuously from the rear fender 10. Each of the bulging portions 131a is formed into a substantially convex shape in a front view in such a manner that the width of a lower portion thereof is slightly larger than the width of an upper portion thereof in a front view.

Further, the paired left and right bulging portions 131a are formed in such a manner that a distance between rear portions of the paired left and right bulging portions 131a in the vehicle width direction is slightly wider than a distance between front portions thereof. Specifically, the deck cover 13 is formed into a shape that the distance between the paired left and right bulging portions 131a in the vehicle width direction is gradually decreased from a rear portion thereof to a front portion thereof (as it approaches the rear window opening 134). Note that a front end of each of the paired left and right bulging portions 131a is inclined in such a manner that an upper end thereof is located on the rear side than a lower end thereof in a side view.

The side wall portion 131b is formed to extend forwardly from an outer wall portion of the bulging portion 131a in the vehicle width direction, and to reach a position proximal to the door glass 7a.

The cover base portion 132 is formed into a substantially flat plate shape of a size capable of covering a rear portion of the accommodation portion S, and is formed to connect between lower ends of the bulging portions 131a, in the vehicle width direction. Further, the cover base portion 132 is formed to have a flat surface substantially continuing to an upper surface of the trunk lid 11.

The cover header portion 133 connects between upper ends of the side wall portions 131b in the vehicle width direction.

The rear window opening 134 is an opening surrounded by front ends of the bulging portions 131a of the paired left and right cover side portions 131, a front end of the cover base portion 132, and a rear end of the cover header portion 133. The rear window opening 134 is formed into an inverted trapezoidal shape in a rear view.

The deck cover 13 is supported on a vehicle body via a pair of left and right cover open/close mechanisms 20. The cover open/close mechanisms 20 are capable of implementing an operation of opening the accommodation portion S by moving the deck cover 13 upwardly, and an operation of closing the accommodation portion S by moving the deck cover 13 downwardly.

As illustrated in FIG. 3, the cover open/close mechanisms 20 include a pair of left and right front cover link members 21 and a pair of left and right rear cover link members 22 configured to support the deck cover 13, and a pair of left and right cover link drive portions 23 configured to pivotally move the front cover link members 21.

The front cover link member 21 is a member of a substantially strip shape in a side view and extending in the up-down direction. An upper end of the front cover link member 21 is pivotally supported to a front end of a cover bracket 136 provided at a lower portion of the deck cover 13.

The rear cover link member 22 is a member of a substantially strip shape in a side view and extending in the up-down direction on the rear side of the front cover link member 21. An upper end of the rear cover link member 22 is pivotally supported to the cover bracket 136 of the deck cover 13.

The cover link drive portion 23 is fixedly engaged with a fender inner panel 10a constituting an inner side wall of the rear fender 10.

Although the illustration is omitted, the cover link drive portion 23 includes a rotatably supported large diameter gear, a plurality of rotatably supported drive gears in, engagement with the large diameter gear, a housing configured to accommodate and hold the gears, and an electric motor configured to drive and rotate the drive gears.

The large diameter gear of the cover link drive portion 23 is connected to a lower end of the front cover link member 21. Further, a lower end of the rear cover link member 22 is pivotally supported to a rear end of an upper portion of the cover link drive portion 23. Specifically, the cover open/close mechanism 20 is a four-link unit constituted by the front cover link members 21 as drive links, and the rear cover link members 22 as slave links.

As illustrated in FIG. 1 to FIG. 3, the openable roof 6 is formed to have a size capable of covering an upper portion of the vehicle compartment portion 8, more specifically, an area between an upper peripheral portion of the front window 16 (a front window frame member 16b to be described later), and the cover header portion 133 of the deck cover 13.

The openable roof 6 includes a front roof 6a, and a rear roof 6b formed on the rear side of the front roof 6a. A front end of the front roof 6a is dismountably mounted to the upper peripheral portion of the front window 16, and a rear end of the rear roof 6b is movable toward and away from the cover header portion 133.

Further, as illustrated in FIG. 3, the rear window 14 includes a rear glass 14a having transparency, a rear window frame member 14b configured to support the rear glass 14a, and a window seal member 14c mounted along an outer peripheral edge of the rear window frame member 14b. Further. a pair of left and right brackets 14d to which roof open/close mechanisms 30 to be described later are connected are fixed to two positions on a front surface of the rear window frame member 14b in the vehicle width direction.

The openable roof 6 and the rear window 14 are supported to the vehicle body via the paired left and right roof open/close mechanisms 30. The roof open/close mechanisms 30 are capable of implementing an operation of accommodating the openable roof 6 and the rear window 14 in the accommodation portion S, and an operation of expanding the openable roof 6 and the rear window 14 in an accommodated state.

As illustrated in FIG. 3, the roof open/close mechanisms 30 include a plurality of roof link members configured to support the openable roof 6 and the rear window 14, and a pair of left and, right roof link drive portions 31 configured to pivotally move the roof link members.

Note that it is possible to adopt any structure for the roof link members, as far as it is possible to accommodate the openable roof 6 and the rear window 14 in the accommodation portion S. In the embodiment, the roof link members are configured as follows.

Specifically, the roof link members include a pair of left and right first roof links 32 configured to connect between the rear roof 6b and the roof link drive portions 31, a pair of left and right second roof links 33 configured to connect between rear ends of the first roof links 32 and the rear window 14, and a pair of left and right third roof links (not illustrated) configured to connect between front ends of the first roof links 32 and the front roof 6a.

The first roof link 32 is a link member of a substantially T-shape in a side view. The first roof link 32 includes a portion to be fixedly engaged with an outer end of the rear roof 6b in the vehicle width direction, and extending in the front-rear direction, and a portion whose lower end is connected to the roof link drive portion 31 and extending in the up-down direction.

The second roof link 33 is a link member of a substantially strip shape in a side view. An upper end of the second roof link 33 is pivotally supported to a rear end of the first roof link 32, and a lower end thereof is pivotally supported to a bracket 14d of the rear window 14.

An end of the third roof link is pivotally supported to a front end of an upper portion of the first roof link 32, and the other end thereof is fixedly engaged with the front roof 6a.

The roof link drive portion 31 is fixedly engaged with an upper portion of a pillar inner panel 17 constituting an opening edge of the door 7 via fastening bolts 34 in the inside of the vehicle compartment portion 8.

Although the illustration is omitted, the roof link drive portion 31 includes a rotatably supported large diameter gear, a plurality of rotatably supported drive gears in engagement with the large diameter gear, and a housing configured to accommodate and hold the gears. The large diameter gear is connected to a lower end of the first roof link 32.

An electric motor (not illustrated) configured to drive and rotate the drive gears is disposed on the outside of the housing in the vehicle width direction. Note that the electric motor is controlled in such a manner that the paired left and right roof link drive portions 31 are synchronously driven on the right side and the left side of the vehicle.

Further, as illustrated in FIG. 3, the roof link drive portion 31 includes a housing extension portion 35 formed by extending an upper end of a front portion of a housing upwardly. The housing extension portion 35 is fixedly engaged with a pillar member 18, which is interposed between the door glass 7a and the deck cover 13, via fastening bolts 36.

As illustrated in FIG. 1 and FIG. 3, the pillar member 18 is a column-shaped member extending in the up-down direction along a rear end of the door glass 7a, and is connected to the pillar inner panel 17 via the roof link drive portion 31.

As illustrated in FIG. 3, the pillar member 18 includes a pillar core member 181 to be fixedly engaged with the housing extension portion 35, and a pillar seal member 182 made of synthetic rubber and mounted on the pillar core member 181 to close a gap between the door glass 7a and the deck cover 13.

As illustrated in FIG. 3, two screw holes (not illustrated) engageable with the fastening bolts 36 configured to engage the housing extension portion 35 of the roof link drive portion 31 are formed in the pillar core member 181.

In the vehicle 1 provided with the cover open/close mechanisms 20 and the roof open/close mechanisms 30 having the aforementioned configuration, the deck cover 13 is moved in such a manner as to open the accommodation portion S, and the openable roof 6 and the rear window 14 are collapsibly folded in the aforementioned state, and are accommodated in the accommodation portion S.

Specifically, in response to an operation of an unillustrated operation switch configured to designate accommodation of the openable roof 6 and the rear window 14, the cover link drive portion 23 of the cover open/close mechanism 20 pivotally moves the front cover link member 21 rearwardly and upwardly. Further, following the pivotal movement of the front cover link member 21, the rear cover link member 22 is pivotally moved in the same direction as the front cover link member 21. Thus, the deck cover 13 is moved upwardly and rearwardly while maintaining a posture thereof that a lower surface of the deck cover 13 is aligned with a substantially horizontal direction to open the accommodation portion S.

After the deck cover 13 starts moving as described above, the roof link drive portion 31 of the roof open/close mechanism 30 pivotally moves the first roof link 32 rearwardly, and the second roof link 33 and the third roof link are pivotally moved in respective predetermined detections in association with the pivotal movement of the first roof link 32.

Accompanied by pivotal movement of the links as described above, the rear roof 6b is pivotally moved downwardly and forwardly by about 180 degrees, and is shifted to a posture that a lower surface of the rear roof 6b faces a lower surface of the front roof 6a in the up-down direction. Further, the rear window 14 is pivotally moved until a posture that a front surface of the rear window 14 faces upwardly, and is moved to the lower side of the rear roof 6b after pivotal movement (after being folded). The front roof 6a, the rear roof 6b, and the rear window 14 stacked one over another in this order from the upper side are moved further rearwardly and downwardly, and are accommodated in the accommodation portion S.

In this way, the roof open/close mechanisms 30 move the openable roof 6 and the rear window 14 into the accommodation portion S, while folding the openable roof 6 and the rear window 14.

As illustrated in FIG. 2, the vehicle 1 includes, as deflection means configured to deflect traveling air flowing from the vehicle front side in a state that the openable roof 6 and the rear window 14 are accommodated in the accommodation portion S, the paired left and right front deflector devices 40 disposed on an upper portion of the front window 16, and the rear deflector 50 disposed on the rear side of seats 15.

As illustrated in FIG. 4 and FIG. 5, the paired left and right front deflector devices 40 are mounted on an upper peripheral portion of the front window 16. Specifically, the front window 16 includes a front glass 16a having transparency, and the front window frame member 16b of a substantially gate shape (an inverted U-shape) in a front view and configured to support the front glass 16a. The paired left and right front deflector devices 40 are mounted on left and right two positions facing the seats 15 in the front-rear direction on an upper peripheral portion of the front window frame member 16b.

The front deflector device 40 includes a deflector body 41, and urging means (not illustrated) configured to urge the deflector body 41 in such a direction that the deflector body 41 is pivotally moved upwardly. As the openable roof 6 is moved away from the front window frame member 16b, the deflector body 41 is pivotally moved upwardly by the urging means, whereby the deflector body 41 is shifted frogman accommodation position indicated by the two-dotted chain line to a projection position indicated by the solid line. The deflector body 41 that is shifted to the projection position is disposed to project upwardly with respect to the front window frame member 16b.

The deflector body 41 (the front deflector device 40) that is shifted to a projection position has a function of deflecting traveling air from the vehicle front side, and allowing the traveling, air to flow rearwardly to a position on the rear side of the cover header portion 133 of the deck cover 13.

The rear deflector 50 has a function of deflecting traveling air (turbulent air) flowing into the vehicle compartment through the rear window opening 134 of the deck cover 13.

Specifically, as illustrated in FIG. 2, FIG. 6, and FIG. 9, the rear deflector 50 is disposed in a rear portion of the vehicle compartment located between the paired left and right seats 15 in a front view, and located on the rear side of the seats 15 in a side view. More specifically, a pair of left and right seatback bars 61 are integrally formed with a seatback trim member 60 configured to partition the accommodation portion S and the vehicle compartment on the rear side of the paired left and right seats 15. The rear deflector 50 is disposed on the rear side of headrest portions of the seats 15, and between the paired left and right seatback bars 61. Note that the scatback bar 61 corresponds to an "adjacent member" in the claims.

As illustrated in FIG. 6 and FIG. 9, the seatback bar 61 is formed in such a manner that the height of an upper end thereof is substantially equal to the height of an upper end of the seat 15. The seatback bar 61 is formed into a substantially trapezoidal shape in a front view, whose length of the lower side is longer than the length of the upper side. The seatback bar 61 is mounted in a forward inclined posture that an upper end thereof is located slightly on the front side than a lower end thereof in a side view.

The seatback bar 61 includes a body portion constituted of a metal pipe member or the like of a substantially inverted U-shape in a front view, and connected to a high rigid member (not illustrated) configured to connect between the paired left and right rear fenders 10 in the vehicle width direction, and a garnish member (a cover member) configured to cover the body portion.

Note that a garnish member of the seatback bar 61 is dividable in the front-rear direction. A parting line of the garnish member is inclined at a substantially same angle as the angle of forward inclination of the seatback bar 61 in a side view (see FIG. 9).

As illustrated in FIG. 6, the rear deflector 50 includes a rear deflector body 52 (corresponding to a "deflection plate" in the claims) of a substantially U-shape in a front view, a lower support portion 51 configured to support a lower portion of the rear deflector body 52, and a pair of left and right upper support portions 62 configured to support an upper portion of the rear deflector body 52. The rear deflector body 52 and the lower support portion 51 are formed to have a substantially same length in the vehicle width direction as the distance between the paired left and right seatback bars 61.

The lower support portion 51 is dismountably mounted to a portion of the seatback trim member 60 configured to cover an area between the paired left and right seatback bars 61.

The upper support portion 62 is formed on an upper portion of an inner peripheral portion of the seatback bar 61 in the vehicle width direction to project inwardly in the vehicle width direction. The upper support portion 62 is disposed in alignment with a parting line of a garnish member of the seatback bar 61, and includes a slit along the parting line.

As illustrated in FIG. 7, the lower support portion 51 is formed into a substantially box shape capable of supporting a lower portion of the rear deflector body 52. Two metal clips 53 engageable with engagement holes (not illustrated) formed in the seatback trim member 60 are mounted on a lower surface of the lower support portion 51 at positions away from each other by a predetermined distance in the vehicle width direction.

As illustrated in FIG. 6, the rear deflector body 52 is a colorless and transparent plate-shaped member made of acrylic resin. The rear deflector body 52 integrally includes a pair of left and right outer air receiving portions 521 (corresponding to an "air receiving portion" in the claims) disposed away from each other in the vehicle width direction, and a middle air receiving portion 522 (corresponding to a "reflection portion" in the claims) configured to connect between lower portions of the outer air receiving portions 521 in the vehicle width direction.

Specifically, the middle air receiving portion 522 is connected to a lower area of each outer air receiving portion 521 with respect to a substantially middle position of each outer air receiving portion 521 in the up-down direction. In other words, the length of the middle air receiving portion 522 in the up-down direction is set shorter than the length of the outer air receiving portion 521 in the up-down direction. Note that as illustrated in FIG. 7, the outer air receiving portions 521 and the middle air receiving portion 522 are formed to have substantially the same thickness.

The rear deflector body 52 having the aforementioned shape includes a flowing space 523 through which traveling air is allowed to flow between the paired left and right outer air receiving portions 521 and on the upper side of the middle air receiving portion 522.

As illustrated in FIG. 6 and FIG. 7, the outer air receiving portion 521 is formed to have a substantially parallelogram shape of a long length in the up-down direction in a front view. An outer lateral edge of the outer air receiving portion 521 in the vehicle width direction is inclined in such a manner that a lower end thereof is located on the inner side in the vehicle width direction than an upper end thereof in a front view.

Specifically, as illustrated in FIG. 6 and FIG. 8, an outer lateral edge of the outer air receiving portion 521 in the vehicle width direction is inclined in such a manner that a lower end thereof is located on the inner side than an upper end thereof in the vehicle width direction so as to align with an inner lateral edge of the seatback bar 61 in the vehicle width direction, and to align with left and right lateral edges of the rear window opening 134 in a rear view.

As illustrated in FIG. 7 and FIG. 9, the outer air receiving portion 521 is supported to the lower support portion 51 in a state that the outer air receiving portion 521 is inclined to align with a parting line of a garnish member of the seatback bar 61 in a side view. More specifically, the outer air receiving portion 521 is supported to the lower support portion 51 in a posture that the outer air receiving portion 521 intersects a vertical line at an angle θ1 of forward inclination at which a lower end thereof is located slightly on the rear side than an upper end thereof.

As illustrated in FIG. 6, the middle air receiving portion 522 is formed into a substantially rectangular shape with a long length in the vehicle width direction in a front view. More specifically, the middle air receiving portion 522 is formed into a substantially inverted trapezoidal shape in a front view, whose length of the lower side is shorter than the length of the upper side, to be in conformity with the shape of the outer air receiving portion 521 that the inner lateral edge thereof in the vehicle width direction is inclined in a front view. The length of the upper side and of the lower side of the middle air receiving portion 522 in the vehicle width direction is set longer than the length of those of the outer air receiving portion 521. AD outer lateral edge of the middle air receiving portion 522 in the vehicle width direction, in other words, a boundary between the middle air receiving portion 522, and the outer air receiving portion 521 is inclined in such a manner that the boundary is substantially in parallel to an inner lateral edge of the seatback bar 61 in the vehicle width direction.

As illustrated in FIG. 6 and FIG. 7 (particularly, in FIG. 7), the middle air receiving portion 522 includes a recess portion 522a formed into a shallow V-shape, which is convex rearwardly in a sectional view. The recess portion 522a is formed in such a manner that the amount of projection thereof increases as the recess portion 522a extends rearwardly from an upper end of the middle air receiving portion 522 toward downwardly. The amount of projection is maximum at a lower position (a position indicated by the symbol Q in FIG. 7) with respect to a middle position of the middle air receiving portion 522 in the up-down direction. Note that a front surface of the recess portion 522a corresponds to a "reflection surface" in the claims.

Thus, the middle air receiving portion 522, specifically, an upper area of the recess portion 522a with respect to the maximum projecting position Q is inclined forwardly in such a manner that the upper area intersects a vertical line at the angle θ2 of forward inclination, which is larger than the angle θ1 of forward inclination of the outer air receiving portion 521. The angle θ2 of forward inclination corresponds to a "predetermined angle" in the claims.

A configuration relating to the recess portion 522a of the middle air receiving portion 522 is described in detail.

As illustrated in FIG. 5 and FIG. 9, a rear view mirror 70 is mounted on an upper portion of an inner surface of the front glass 16a. The rear view mirror 70 is located on the upper front side of the rear deflector 50, and is disposed to face the rear deflector 50 in the front-rear direction in a plan view. Note that the rear view mirror 70 is disposed in such a manner that a mirror portion thereof is inclined slightly downwardly according to a seating position of a passenger.

As illustrated in FIG. 9, a center console 80 extending in the front-rear direction is disposed between the paired left and right seats 15.

Switches such as a rotary switch or a pressing switch projecting upwardly from an upper surface of the center console 80 are disposed on the center console 80. The switches are located on the lower front side of the recess portion 522a of the rear deflector 50. Although a specific purpose of use of the switches is not specifically limited, examples of the switches are an operation switch configured to allow a passenger to operate a navigation device, an operation switch configured to allow a passenger to switch the suspension mode, and an operation switch configured to allow a passenger to operate a vehicle information display device configured to display various vehicle information.

A light source 81 configured to emit illumination light spreading radially in association with turning on of a side marker lamp or the like is internally provided in the switch. The light source 81 is mounted in a posture that an upper surface thereof faces straight upwardly, or in a slightly inclined posture that an upper surface thereof faces forwardly and upwardly.

As illustrated in FIG. 9, it is assumed that an imaginary straight line connecting between a front surface of an upper portion of the recess portion 522a and the light source 81 in a side view, in other words, an imaginary straight line indicating a locus of illumination light to be emitted toward a front surface of an upper portion of the recess portion 522a in a side view is a first imaginary line VL1.

Further, it is assumed that an imaginary straight line connecting between the front surface of the upper portion of the recess portion 522a and a middle portion of the rear view mirror 70 in a side view is a second imaginary line VL2, and an imaginary straight line orthogonal to the front surface of the recess portion 522a in a side view is a reference imaginary line VL3.

The recess portion 522a of the rear deflector 50 (more specifically, an upper area with respect to the rearwardly maximum projecting position Q) is inclined forwardly to attain the angle θ2 of inclination with respect to a vertical line. The angle θ2 of forward inclination of the recess portion 522a is set to be an angle satisfying a condition that an angle θ4 defined by the reference imaginary line VL3 and the second imaginary line VL2 is smaller than an angle θ3 defined by the reference imaginary line VL3 and the first imaginary line VL1.

Figure 10:
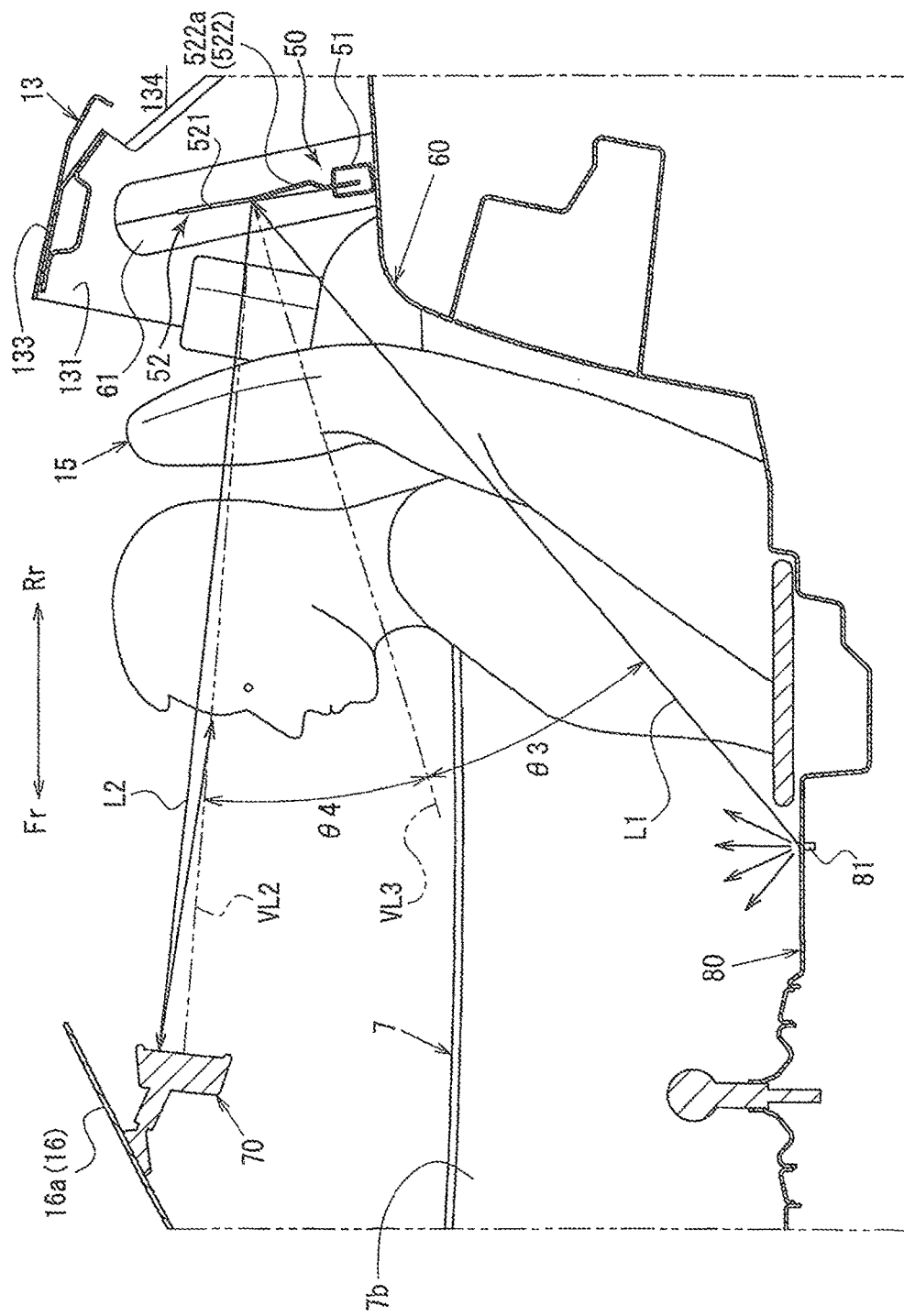
FIG. 10 is an explanatory diagram illustrating reflection of illumination light onto the rear deflector.

FIG. 10 is an explanatory diagram illustrating a manner of reflection of illumination light emitted from the light source 81 onto the rear deflector 50.

When a side marker lamp is turned on by a passenger's operation, the light source 81 is turned on in association with the side marker lamp. As illustrated in FIG. 10, the light source 81 in an ON state emits illumination light L1 in such a manner as to spread in multiple directions.

Illumination light L1 from the light source 81 is incident on a front surface of an upper portion of the recess portion 522a of the rear deflector 50 at an incident angle, which is substantially equal to the angle θ3 defined by the reference imaginary line VL3 and the first imaginary line VL1. Further, illumination light L1 incident on the front surface of the upper portion of the recess portion 522a is reflected at a reflection angle, which is substantially equal to the angle θ3 defined by the reference imaginary line VL3 and the first imaginary line VL1, and is output as reflection light L2 from the recess portion 522a.

In this case, the angle θ4 defined by the reference imaginary line VL3 and the second imaginary line VL2 is smaller than the angle θ3 defined by the reference imaginary line VL3 and the first imaginary line VL1. Therefore, reflection light L2 reflected by the recess portion 522a is output from the recess portion 522a at a reflection angle larger than the angle θ4 defined by the reference imaginary line VL3 and the second imaginary line VL2 (in other words, at a reflection angle substantially equal to the angle θ3). Therefore, reflection light L2 reflected by the recess portion 522a reaches an upper portion with respect to a middle portion of the rear view mirror 70 through an area on the upper side with respect to the second imaginary line VL2.

Reflection light L2 that reaches an upper portion with respect to a middle portion of the rear view mirror 70 is reflected by an upper portion of a mirror surface of the rear view mirror 70. In this case, the rear view mirror 70 is inclined in such a manner that a mirror surface thereof faces slightly downwardly. Therefore, reflection light L2 from the recess portion 522a is incident on the rear view mirror 70 at a small incident angle from the upper side with respect to an imaginary line (not illustrated) orthogonal to the mirror surface of the rear view mirror 70. According to this configuration, reflection light L2 incident on the rear view mirror 70 is reflected at a small reflection angle, which is substantially equal to the incident angle, and is directed toward the forehead of a passenger seated on the lower rear side of the rear view mirror 70.

Figure 11:
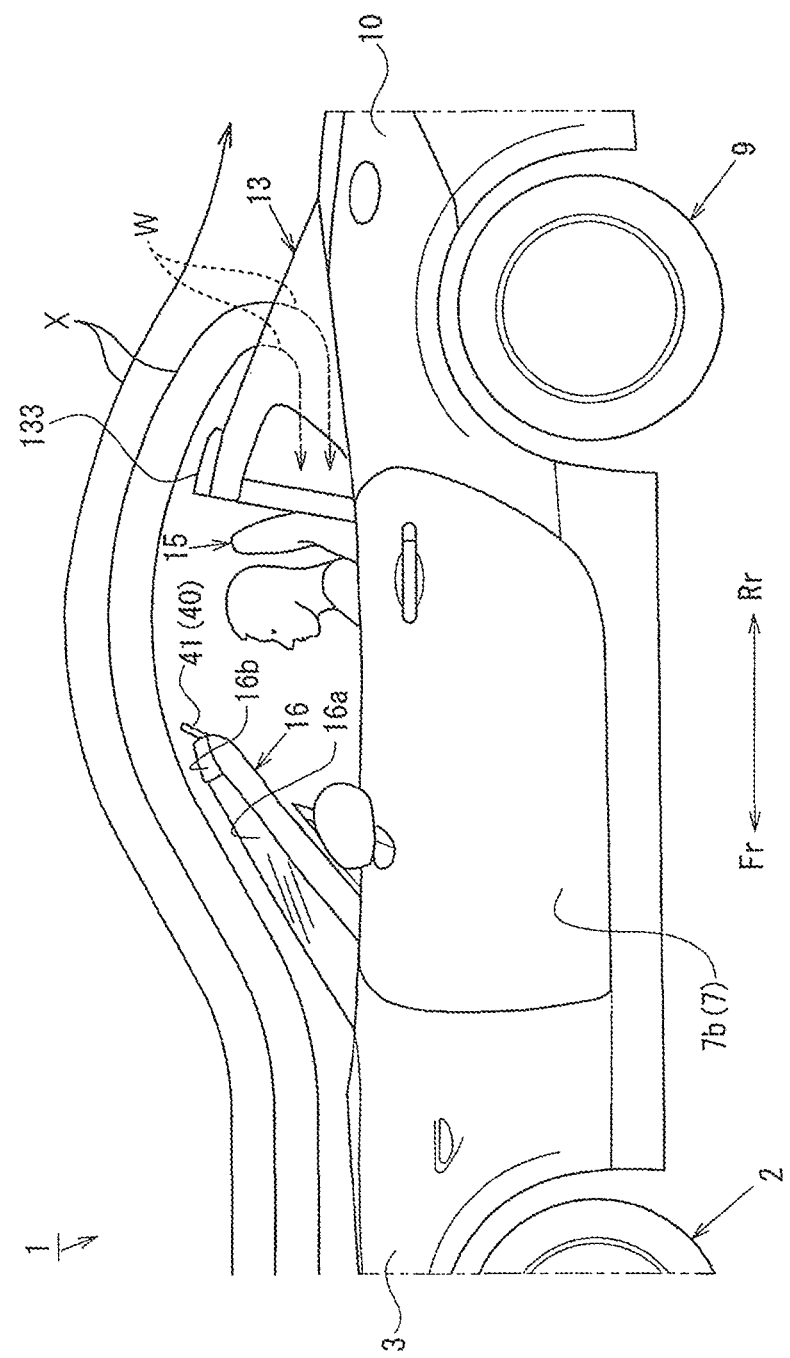
FIG. 11 is an explanatory diagram illustrating a flow of traveling air in a side view.
Figure 12:
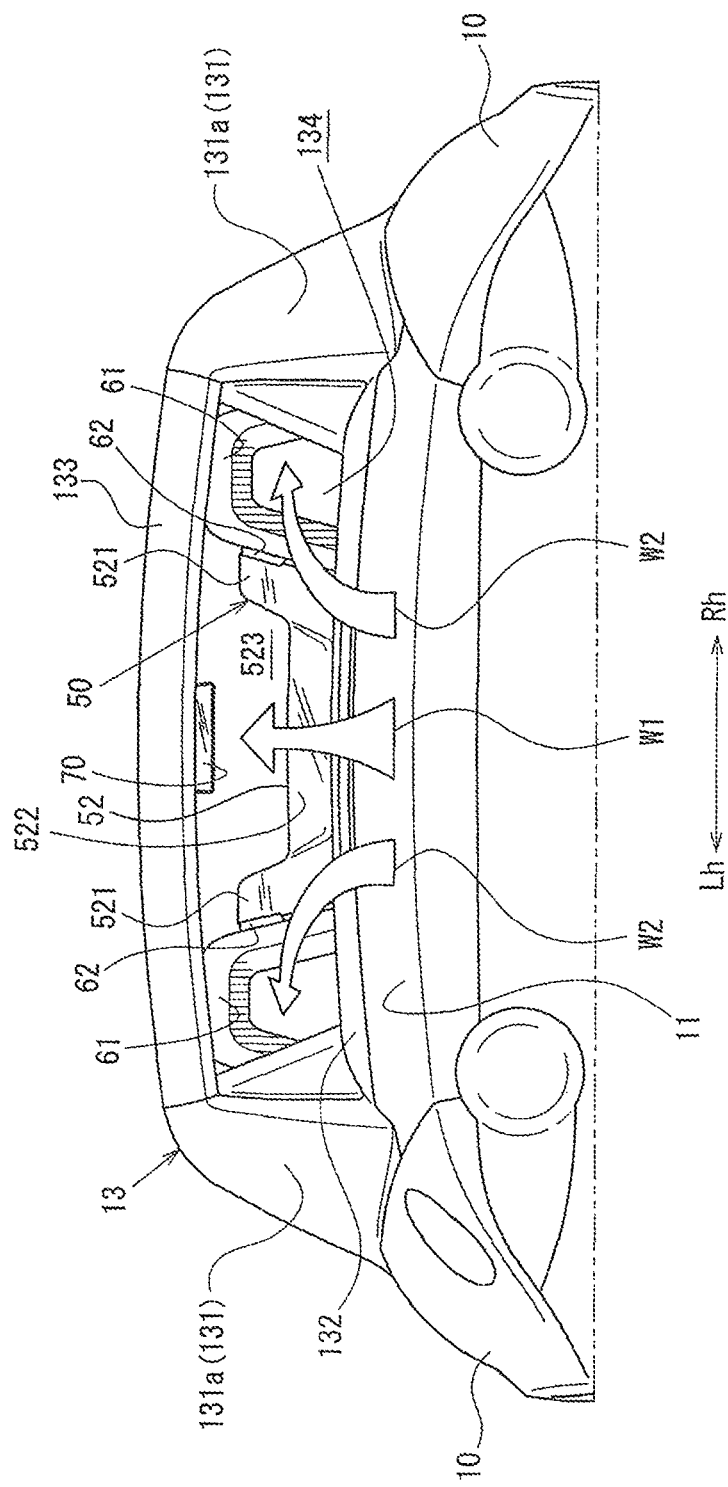
FIG. 12 is an explanatory diagram illustrating a flow of traveling air when viewed from the vehicle rear side.

There is described a flow of traveling air in the vehicle 1 provided with the rear deflector 50 having the aforementioned configuration, in other words, a flow of traveling air X flowing rearwardly of the vehicle over the seats 15 from the front window 16, using FIG. 11 and FIG. 12.

Note that FIG. 11 is a diagram illustrating a flow of traveling air X in a side view, and FIG. 12 is a diagram illustrating a flow of traveling air X when viewed from the vehicle rear side.

When the vehicle 1 is traveling in a state that the openable roof 6 and the rear window 14 are accommodated, as illustrated in FIG. 11, traveling air X from the vehicle front side flows rearwardly and upwardly along the front window 16, and reaches the front deflector devices 40. Traveling air X passing through the front deflector devices 40 further flows rearwardly while passing through an area high over the seats 15, and reaches the cover header portion 133 of the deck cover 13.

A part of traveling air X that reaches the cover header portion 133 has its direction changed in such a manner that air is caused to flow back forwardly from the vehicle rear side by a negative pressure of the vehicle compartment, and flows into the vehicle compartment through the rear window opening 134. In the following, a part of traveling air, whose direction is changed from air flowing rearwardly of the vehicle to air flowing back forwardly of the vehicle, is referred to as turbulent air W (see FIG. 11).

As illustrated in FIG. 12, a part of turbulent air W flowing into the vehicle compartment through the rear window opening 134 flows further forwardly through the flowing space 523 formed between the paired left and right outer air receiving portions 521. On the other hand, turbulent air W that impinges on the rear deflector 50 has its direction changed by the outer air receiving portions 521, for instance, and flows outwardly in the vehicle width direction.

In other words, turbulent air W flowing into the vehicle compartment through the rear window opening 134 is separated into turbulent air W1 flowing forwardly through the flowing space 523, and turbulent air W2 flowing outwardly in the vehicle width direction by the rear deflector 50.

According to the rear structure of the vehicle 1 described as above, it is possible to avoid lowering of rear visibility due to reflection light L2 reflected by the rear deflector body 52.

Specifically, when light is emitted from the light source 81, illumination light L1 is incident on the recess portion 522a of the rear deflector body 52 along the first imaginary line VL1 connecting between a front surface of the recess portion 522a, and the light source 81. Assuming that the angle θ3 defined by the reference imaginary line VL3 and the first imaginary line VL1 is an incident angle, illumination light L1 incident on the recess portion 522a is reflected at a reflection angle, which is substantially equal to the incident angle (θ3).

In this case, the angle θ4 defined by the second imaginary line VL2 connecting between a front surface of the recess portion 522a and a middle portion of the rear view mirror 70, and the reference imaginary line VL3 is made different from the angle θ3 defined by the reference imaginary line VL3 and the first imaginary line VL1. Therefore, reflection light L2 reflected by a front surface of the recess portion 522a as described above, in other words, light reflected at a reflection angle, which is substantially equal to the incident angle (the angle θ3 defined by the reference imaginary line VL3 and the first imaginary line VL1) is output from the front surface of the recess portion 522a in a direction different from the direction of the second imaginary line VL2, and reaches a portion other than the middle portion of the rear view mirror 70. According to this configuration, it is possible to avoid light emitted from the light source 81 and reflected by the rear deflector body 52 from reaching a middle portion of the rear view mirror 70, in other words, it is possible to avoid illumination light L1 from the light source 81 from being reflected on a middle portion of the rear view mirror 70.

In this example, a middle portion of the rear view mirror 70 is a portion, which is likely to be in the field of vision of a passenger even in a case where the passenger sees an end of the rear view mirror 70 in the vehicle width direction, and is a portion where the amount of reflected information is large, as compared with both ends of the rear view mirror 70 in the vehicle width direction.

On the other hand, in the embodiment, it is possible to avoid illumination light L1 emitted from the light source 81 from being reflected on a middle portion of the rear view mirror 70. This is advantageous in suppressing lowering of rear visibility due to the light reflection.

In addition to the above, the rear view mirror 70 located on the upper side of the head of a passenger is adjusted to a posture such that the rear view mirror 70 is inclined slightly rearwardly and downwardly so that a middle portion of the rear view mirror 70 faces the vicinity of the eyes of the passenger. Therefore, reflection light L2 from the rear deflector body 52 located on the lower rear side of the rear view mirror 70 is incident on the rear view mirror 70 at a small incident angle, and then, is reflected rearwardly at a small reflection angle, which is substantially equal to the incident angle.

Therefore, in a case where reflection light L2 from the rear deflector body 52 is incident on a middle portion of the rear view mirror 70, light reflected by the rear view mirror 70 tends to be directed toward the vicinity of the eyes of a passenger, which may dazzle the passenger.

On the other hand, in the embodiment, reflection light L2 from the rear deflector body 52 is not directed to a middle portion of the rear view mirror 70, but is directed to an upper portion of the rear view mirror 70. Therefore, it is possible to avoid light reflected by the rear view mirror 70 from reaching in the vicinity of the eyes of a passenger. Thus, even in a case where reflection light L2 is reflected by the rear view mirror 70, it is possible to avoid that the reflection light may dazzle a passenger.

As described above, according to the embodiment, it is possible to avoid illumination light L1 from the light source 81 from being reflected on a middle portion of the rear view mirror 70, despite that the light source 81 is provided in a switch on the center console 80. This makes it possible to avoid that light reflection may dazzle a passenger (avoid light reflected by the rear view mirror 70 from reaching in the vicinity of the eyes of a passenger).

Further, in the embodiment, the rear deflector body 52 is formed in such a manner that the angle θ2 of forward inclination of the middle air receiving portion 522 with respect to a vertical line, and the angle θ1 of forward inclination of the outer air receiving portion 521 with respect to a vertical line are made different from each other. This makes it possible to avoid reflection of illumination light L1 on the rear view mirror 70, without impairing the function of the rear deflector body 52 configured to deflect turbulent air W from the vehicle rear side.

Specifically, it is necessary to form a back surface of the rear deflector body 52 as an inclined surface inclined with respect to a vertical line in order to deflect turbulent air W from the vehicle rear side in an intended direction.

However, an angle of inclination of the rear deflector body 52, which is necessary to make the angle θ3 defined by the reference imaginary line VL3 and the first imaginary line VL1, and the angle θ4 defined by the reference imaginary line VL3 and the second imaginary line VL2 different from each other, in other words, the angle θ2 of forward inclination may not always coincide with an angle of inclination necessary for sufficiently exhibiting a deflection mechanism. Therefore, in a case where a rear deflector body is formed into a uniformly flat plate shape, and the angle of inclination of the rear deflector body is set to the aforementioned angle θ2 of forward inclination, it may be impossible to deflect turbulent air W from the vehicle rear side in an intended direction.

On the other hand, according to the embodiment, in which there is prepared the rear deflector body 52 integrally including the recess portion 522a and the outer air receiving portion 521, whose angles of inclination with respect to a vertical line are different front each other, it is possible to appropriately set the angle of inclination of the recess portion 522a in such a manner that the angle θ3 defined by the reference imaginary line VL3 and the first imaginary line VL1, and the angle θ4 defined by the reference imaginary line VL3 and the second imaginary line VL2 are different from each other, while disposing the outer air receiving portion 521 at an angle suitable for deflecting turbulent air W from the vehicle rear side. This makes it possible to avoid reflection of illumination light L1 on the rear view mirror 70, without impairing the function of deflecting turbulent air W from the vehicle rear side.

Further, in the embodiment, it is possible to enhance comfort of a passenger, because the rear deflector body 52 integrally includes the middle air receiving portion 522 disposed in an area including a middle portion of the rear deflector body 52 in the vehicle width direction, and the paired left and right outer air receiving portions 521 disposed on the outer sides of the middle air receiving portion 522 in the vehicle width direction.

Specifically, in a case where the middle air receiving portion 522 is disposed at a middle position of the vehicle in the vehicle width direction, the middle air receiving portion 522 and the rear view mirror 70 face each other in the front-rear direction in a plan view, and the middle air receiving potion 522 is likely to receive illumination light Li from the light source 81. This may cause light emitted from the light source 81 and reflected by the middle air receiving portion 522 (a front surface of the recess portion 522a) to reach the rear view mirror 70.

However, the front surface of the recess portion 522a is inclined at the angle θ2 of forward inclination in such a manner that the angle θ3 defined by the reference imaginary line VL3 and the first imaginary line V1, and the angle θ4 defined by the reference imaginary line VL3 and the second imaginary line VL2 are different from each other. This makes it possible to avoid illumination light L1 from the light source 81 from being reflected on the rear view mirror 70. Therefore, even in a case where the middle air receiving portion 522 is disposed at a middle position of the vehicle in the vehicle width direction, it is possible to securely avoid lowering of rear visibility due to reflection of illumination light L1.

On the other hand, turbulent air W from the vehicle rear side tends to pass through the outside of the middle air receiving portion 522 in the vehicle width direction, and to flow toward the vicinity of the head of a passenger. In the embodiment, however, the outer air receiving portions 521 are disposed on the outer sides of the middle air receiving portion 522 in the vehicle width direction. Therefore, turbulent air W flowing toward the vicinity of the head of a passenger is deflected outwardly in the vehicle width direction by the outer air receiving portions 521. Thus, it is possible to securely avoid impingement of turbulent air W from the vehicle rear side on a passenger, particularly, wind around the ears of a passenger, and noise generated by the wind.

As described above, according to the embodiment, it is possible to avoid reflection of illumination light L1 on the rear view mirror 70, and impingement of turbulent air W, which annoy a passenger. Therefore, it is possible to enhance comfort of the passenger.

Further, an outer lateral edge of the middle air receiving portion 522 in the vehicle width direction is formed to be substantially parallel to an inner lateral edge of the seatback bar 61 in the vehicle width direction in a rear view. Therefore, it is possible to enhance design characteristics of the rear deflector body 52 in a rear view, while avoiding reflection of illumination light L1 on the rear view mirror 70.

Specifically, a lateral edge of the middle air receiving portion 522 is formed to be substantially parallel to a lateral edge of the seatback, bar 61. Therefore, it is possible to form a boundary between the middle air receiving portion 522 and the outer air receiving portion 521 into a shape in conformity with the shape of the seatback bar 61, and to enhance the appearance of a vehicle rear portion including the rear deflector body 52 and the seatback bar 61.

For instance, it is possible to make the external appearance of the rear deflector body 52, which is viewed through the rear window opening 134 in a state that the rear window 14 is accommodated in the accommodation portion S, fit the seatback bar 61, and to enhance the appearance of a vehicle rear portion.

Further, in the embodiment, the rear deflector body 52 is made of acrylic resin having transparency. Therefore, it is possible to sufficiently secure rear visibility through the rear deflector body 52. This means that it is possible to secure enhanced rear visibility, in combination with the aforementioned measures for avoiding light emitted from the light source 81 and reflected by the rear deflector body 52 from reaching a middle portion of the rear view mirror 70.

Further, in the embodiment, the light source 81 is disposed in a posture that an upper surface thereof faces straight upwardly, or in a slightly inclined posture that an upper surface thereof faces forwardly and upwardly. Therefore, as compared with brightness of illumination light Li incident on an upper portion of the recess portion 522a of the rear deflector body 52, brightness of illumination light L1 incident on a lower portion of the recess portion 522a is reduced.

Therefore, even in a case where illumination light Li incident on a lower portion of the recess portion 522a is reflected toward a middle portion of the rear view mirror 70, it is possible to suppress brightness of reflection light L2 that reaches the middle portion of the rear view mirror 70. This makes it possible to avoid lowering of rear visibility due to reflection of illumination light L1 on the rear view mirror 70.

As described above, a preferred embodiment of the present invention is described. The present invention, however, is not limited to a configuration of the embodiment, but may be modified in various ways as far as the modifications do not depart from the gist of the present invention.

For instance, in the embodiment, the openable roof 6 (a roof) is a hard-top openable roof configured to be accommodated in a vehicle body in a folded state. The embodiment, however, is not limited to the above. The openable roof may be an openable roof to be accommodated in a vehicle body in a dismounted state, or a soft-top openable roof constituted by hood cloth and a hood bone.

Further, the vehicle 1 of the embodiment is a convertible vehicle, in which the openable roof 6 and the rear window 14 are accommodated in a vehicle body. Various alternatives are proposed, however, as far as at least a part of members constituting an upper portion and a rear portion of a vehicle compartment is accommodated in a vehicle. For instance, a vehicle configured to accommodate only a roof constituting an upper portion of a vehicle compartment, or a vehicle configured to accommodate only a rear window may be employed.

Further, in the embodiment, the rear deflector body 52 (a deflection plate) is a colorless and transparent member made of acrylic resin. The embodiment, however, is not limited to the above. For instance, a rear deflector body including a glossy front surface may be used.

Further, in the embodiment, the angle θ2 of forward inclination of the recess portion 522a is set in such a manner that the angle θ4 defined by the reference imaginary line VL3 and the second imaginary line VL2 is smaller than the angle θ3 defined by the reference imaginary line VL3 and the first imaginary line VL1. The embodiment, however, is not limited to the above. The angle θ2 of forward inclination of the recess portion 522a may be set in such a manner that the angle θ4 with respect to the second imaginary line VL2 is larger than the angle θ3 with respect to the first imaginary line VL1.

<Summary of Embodiment>

The following is a summary of the embodiment.

The embodiment relates to a rear structure of a vehicle provided with a pair of left and right seats disposed in a vehicle compartment, a roof configured to cover an upper portion of the vehicle compartment, and a rear window located on a vehicle rear side of the roof, the vehicle rear structure being capable of accommodating at least one of the roof and the rear window in a vehicle body. The vehicle rear structure includes a deflection plate standing upright between the paired seats and on a rear side of the seats; and a light source provided on a lower front side of the deflection plate. The deflection plate includes a reflection surface configured to reflect light forwardly. When it is assumed that an imaginary straight line connecting between the light source and the reflection surface of the deflection plate is a first imaginary line, an imaginary straight line connecting between a middle portion of a rear view mirror provided on an upper front side of the deflection plate, and the reflection surface of the deflection plate is a second imaginary line, and an imaginary straight line orthogonal to the reflection surface of the deflection plate is a reference imaginary line, the reflection surface of the deflection plate is an inclined surface inclined at a predetermined angle in such a manner that an angle defined by the reference imaginary line and the first imaginary line, and an angle defined by the reference imaginary line and the second imaginary line are different from each other in a side view.

The roof may be an openable roof to be accommodated in a vehicle body in a folded state, or may be an openable roof to be accommodated in a vehicle body in a dismounted state. Further, the roof may be a soft-top openable roof constituted by hood cloth and a hood bone, or may be a hard-top openable roof including a metal roof panel.

The deflection plate may be a deflection plate made of synthetic resin having transparency, for instance, or may be a deflection plate having a glossy front surface.

The light source may be a light source such as an LED, which is incorporated in various switches such as an operation switch configured to allow a passenger to operate a navigation device, or a changeover switch configured to allow a passenger to switch the suspension mode; or may be a light source mounted in a component other than a switch.

According to the vehicle rear structure, it is possible to avoid lowering of rear visibility due to reflection light reflected by a deflection plate.

Specifically, when light is emitted from the light source, illumination light is incident on the reflection surface of the deflection plate along the first imaginary line connecting between the reflection surface and the light source. Assuming that the angle defined by the reference imaginary line and the first imaginary line is an incident angle, illumination light incident on the reflection surface is reflected at a reflection angle, which is substantially equal to the incident angle.

In this case, the angle defined by the second imaginary line connecting between the reflection surface and a middle portion of the rear view mirror, and the reference imaginary line is made different from the angle defined by the reference imaginary line and the first imaginary line. Therefore, reflection light reflected by the reflection surface as described above, namely, light reflected at a reflection angle, which is substantially equal to the incident angle (the angle defined by the reference imaginary line and the first imaginary line) is, output from the reflection surface in a direction different from the direction of the second imaginary line, and reaches a portion other than the middle portion of the rear view mirror. According to this configuration, it is possible to avoid light emitted from a light source and reflected by a deflection plate from reaching a middle portion of a rear view mirror, in other words, it is possible to avoid light emitted from a light source from being reflected on a middle portion of a rear view mirror.

Note that a middle portion of a rear view mirror is a portion, which is likely to be in the field of vision of a passenger even in a case where the passenger sees an end of the rear view mirror in the vehicle width direction, and is a portion where the amount of reflected information is large, as compared with both ends of the rear view mirror in the vehicle width direction.

On the other hand, in the vehicle rear structure, it is possible to avoid light emitted from a light source from being reflected on a middle portion of the rear view mirror. This is advantageous in suppressing lowering of rear visibility due to the light reflection.

In addition to the above, the rear view mirror located on the upper side of the head of a passenger is adjusted to a posture such that the rear view mirror is inclined rearwardly and downwardly so that a middle portion of the rear view minor faces the vicinity of the eyes of the passenger. Therefore, reflection light from the deflection plate located on the lower rear side of the rear view mirror is incident on the rear view mirror at a small incident angle, and then, is reflected rearwardly at a small reflection angle, which is substantially equal to the incident angle.

Therefore, in a case where reflection light from the deflection plate is incident on a middle portion of the rear view mirror, light reflected by the rear view mirror tends to be directed toward the vicinity of the eyes of a passenger, which may dazzle the passenger.

On the other hand, in the vehicle rear structure, reflection light from the deflection plate is directed to a portion other than the middle portion of the rear view mirror. Therefore, it is possible to avoid light reflected by the rear view mirror from reaching in the vicinity of the eyes of a passenger. For instance, in a case where reflection light from the deflection plate is incident on an upper portion of the rear view mirror, light reflected by the rear view mirror reaches an area (the forehead) above the eyes of a passenger. According to this configuration, even in a case where reflection light from the deflection plate is reflected by the rear view mirror, it is possible to avoid that the reflection light may dazzle a passenger.

As described above, according to the vehicle rear structure, it is possible to avoid light emitted from the light source from being reflected on a middle portion of the rear view mirror despite that the light source is disposed on the lower front side of the deflection plate. This makes it possible to avoid that light reflection may dazzle a passenger (avoid light reflected by the rear view mirror from reaching in the vicinity of the eyes of a passenger).

Preferably, the deflection plate may integrally include a substantially flat plate-shaped reflection portion having the reflection surface inclined at the predetermined angle, and a substantially flat plate-shaped air receiving portion configured to receive turbulent air flowing into the vehicle compartment from the vehicle rear side. An angle of inclination of the reflection portion with respect to a vertical line, and an angle of inclination of the air receiving portion with respect to a vertical line may be made different from each other in a side view.

According to the aforementioned configuration, it is possible to avoid reflection of illumination light on the rear view mirror, without impairing the function of the deflection plate configured to deflect turbulent air.

Specifically, it is necessary to form a back surface of the deflection plate as an inclined surface inclined with respect to a vertical line in order to deflect turbulent air from the vehicle rear side in an intended direction.

However, an angle of inclination of the deflection plate, which is necessary to make the angle defined by the reference imaginary line and the first imaginary line, and the angle defined by the reference imaginary line and the second imaginary line different from each other, in other words, a predetermined angle may not always coincide with an angle of inclination of the deflection plate necessary for sufficiently exhibiting a deflection function. Therefore, in a case where a deflection plate is formed into a uniformly flat plate shape, and the angle of inclination of the deflection plate is set to the aforementioned predetermined angle, it may be impossible to deflect turbulent air from the vehicle rear side in an intended direction.

On the other hand, in a case where there is prepared the deflection plate integrally including the reflection portion and the air receiving portion, whose angles of inclination with respect to a vertical line are different from each other, it is possible to appropriately set the angle of inclination of the reflection portion in such a manner that the angle defined by the reference imaginary line and the first imaginary line, and the angle defined by the reference imaginary line and the second imaginary line are different from each other, while disposing the air receiving portion at an angle of inclination suitable for deflecting turbulent air from the vehicle rear side. This makes it possible to avoid, reflection of illumination light on a rear view mirror, without impairing the function of deflecting turbulent air.

Preferably, the deflection plate may integrally include the reflection portion disposed in an area including a middle portion of the deflection plate in a vehicle width direction, and a pair of the left and right air receiving portions disposed on outer sides of the reflection portion in the vehicle width direction.

According to the aforementioned configuration, it is possible to enhance comfort of a passenger.

Specifically, in a case where the reflection portion of the deflection plate is disposed at a middle position of the vehicle in the vehicle width direction, the reflection portion and the rear view mirror face each other in the front-rear direction in a plan view, and the reflection portion is likely to receive light emitted from the light source. This may cause light emitted from the light source and reflected by the reflection portion (a reflection surface corresponding to a front surface of the reflection portion) to reach the rear view mirror.

However, the reflection surface is inclined at a predetermined angle in such a manner that the angle defined by the reference imaginary line and the first imaginary line, and the angle defined by the reference imaginary line and the second imaginary line are different from each other. This makes it possible to avoid light emitted from the light source from being reflected on the rear view mirror. Therefore, even in a case where the reflection portion is disposed at a middle position of the vehicle in the vehicle width direction, it is possible to securely avoid lowering of rear visibility due to reflection of illumination light.

Turbulent air from the vehicle rear side tends to pass through the outside of a reflection portion in the vehicle width direction, and to flow toward the vicinity of the head of a passenger. In the aforementioned configuration, however, an air receiving portion is disposed on the outside of a reflection portion in the vehicle width direction. Therefore, turbulent air flowing toward the vicinity of the head of a passenger is deflected outwardly in the vehicle width direction, for instance, by the air receiving portion. Thus, it is possible to securely avoid impingement of turbulent air on a passenger, and noise generated by the impingement.

As described above, according to the aforementioned configuration, it is possible to avoid reflection of illumination light on the rear view mirror, and impingement of turbulent air, which annoy a passenger. Therefore, it is possible to enhance comfort of the passenger.

Preferably, the vehicle rear structure may further include an adjacent member adjacent to the deflection plate in a vehicle width direction, and a part of an outer peripheral edge of the reflection portion may be formed to be substantially parallel to a part of an outer peripheral edge of the adjacent member in a rear view.

The adjacent member may be a seatback bar projecting upwardly on the rear side of a seat, for instance in a case where a rear window is accommodated in a vehicle body, the adjacent member may be a peripheral edge portion of a window opening, which remains after accommodation of the rear window.

A part of an outer peripheral edge of the reflection portion may be one of an upper edge portion, a lower edge portion, a left edge portion, and a right edge portion, or may be combination of these edge portions.

According to the aforementioned configuration, it is possible to enhance design characteristics of the deflection plate in a rear view, while avoiding reflection of illumination light on the rear view mirror.

Specifically, a part of an outer peripheral edge of the reflection portion is formed substantially parallel to a part of an outer peripheral edge of the adjacent member. Therefore, it is possible to form a boundary between the reflection portion and the air receiving portion into a shape in conformity with the shape of the adjacent member, and to enhance the appearance of a vehicle rear portion including the deflection plate and the adjacent member in a rear view.

For instance, in a case where the rear window is accommodated in a vehicle body, the external appearance of the deflection plate, which is viewed through the window opening in the accommodated state, fits an adjacent member. Thus, it is possible to enhance the appearance of a vehicle rear portion.

Preferably, the deflection plate may be made of synthetic resin having transparency.

According to the aforementioned configuration, it is possible to secure enhanced rear visibility.

Specifically, in a case where a deflection plate is made of synthetic resin having transparency, it is possible to sufficiently secure rear visibility through the deflection plate. A part of light emitted from a light source may be reflected by the deflection plate, and the reflection light may reach the rear view mirror, despite that the material of the deflection plate has transparency. However, according to the vehicle rear structure, in which the angle defined by the reference imaginary line and the first imaginary line, and the angle defined by the reference imaginary line and the second imaginary line are made different from each other, it is possible to avoid that light reflected by the rear view mirror may dazzle a passenger. Therefore, it is possible to secure enhanced rear visibility.

Note that in a case where the reflection surface of the deflection plate is a glossy surface, enhanced design characteristics of the deflection plate are expected. In this case, the amount of reflection on the deflection plate may increase. However, enhanced rear visibility is yet secured by the effect of avoiding that light dazzles a passenger by angle setting as described above.

The invention claimed is:

1. A rear structure of a vehicle provided with a pair of left and right seats disposed in a vehicle compartment, a roof configured to cover an upper portion of the vehicle compartment, and a rear window located on a vehicle rear side of the roof, the vehicle rear structure being capable of accommodating at least one of the roof and the rear window in a vehicle body, the vehicle rear structure comprising:
a deflection plate standing upright between the paired seats and on a rear side of the seats; and
a light source provided on a lower front side of the deflection plate, wherein
the deflection plate includes a reflection surface configured to reflect light forwardly, and
when it is assumed that an imaginary straight line connecting between the light source and the reflection surface of the deflection plate is a first imaginary line, an imaginary straight line connecting between a middle portion of a rear view mirror provided on an upper front side of the deflection plate, and the reflection surface of the deflection plate is a second imaginary line, and an imaginary straight line orthogonal to the reflection surface of the deflection plate is a reference imaginary line, the reflection surface of the deflection plate is an inclined surface inclined at a predetermined angle in such a manner that an angle defined by the reference imaginary line and the first imaginary line, and an angle defined by the reference imaginary line and the second imaginary line are different from each other in a side view.

2. The vehicle rear structure according to claim 1, wherein the deflection plate integrally includes a substantially flat plate-shaped reflection portion having the reflection surface inclined at the predetermined angle, and a substantially flat plate-shaped air receiving portion configured to receive turbulent air flowing into the vehicle compartment from the vehicle rear side, and
an angle of inclination of the reflection portion with respect to a vertical line, and an angle of inclination of the air receiving portion with respect to a vertical line are made different from each other in a side view.

3. The vehicle rear structure according to claim 2, wherein the deflection plate integrally includes the reflection portion disposed in an area including a middle portion of the deflection plate in a vehicle width direction, and a pair of the left and right air receiving portions disposed on outer sides of the reflection portion in the vehicle width direction.

4. The vehicle rear structure according to claim 3, further comprising:
an adjacent member adjacent to the deflection plate in a vehicle width direction, wherein
a part of an outer peripheral edge of the reflection portion is formed to be substantially parallel to a part of an outer peripheral edge of the adjacent member in a rear view.

5. The vehicle rear structure according to claim 4, wherein the deflection plate is made of synthetic resin having transparency.

6. The vehicle rear structure according to claim 2, further comprising:
an adjacent member adjacent to the deflection plate in a vehicle width direction, wherein
a part of an outer peripheral edge of the reflection portion is formed to be substantially parallel to a part of an outer peripheral edge of the adjacent member in a rear view.

7. The vehicle rear structure according to claim 6, wherein the deflection plate is made of synthetic resin having transparency.

8. The vehicle rear structure according to claim 3, wherein the deflection plate is made of synthetic resin having transparency.

9. The vehicle rear structure according to claim 2, wherein the deflection plate is made of synthetic resin having transparency.

10. The vehicle rear structure according to claim 1, wherein
the deflection plate is made of synthetic resin having transparency.

* * * * *